United States Patent [19]

Chelminski et al.

[11] 4,210,222

[45] Jul. 1, 1980

[54] AIR GUN MONITORING METHOD AND APPARATUS

[75] Inventors: Paul Chelminski, Norwalk; Stephen V. Chelminski, West Redding, both of Conn.

[73] Assignee: Bolt Associates, Inc., Norwalk, Conn.

[21] Appl. No.: 917,792

[22] Filed: Jun. 22, 1978

[51] Int. Cl.² ............................................. G01V 1/38
[52] U.S. Cl. .................................... 181/107; 181/120
[58] Field of Search ........................ 181/107, 111, 120

[56] References Cited

U.S. PATENT DOCUMENTS

| | | | |
|---|---|---|---|
| 3,249,177 | 5/1966 | Chelminski | 181/120 |
| 3,379,273 | 4/1968 | Chelminski | 367/144 |
| 3,588,039 | 6/1971 | Chelminski et al. | 181/120 |
| 3,653,460 | 4/1972 | Chelminski | 181/120 |
| 3,687,218 | 9/1972 | Ritter | 181/107 |
| 3,779,335 | 12/1973 | Chelminski | 181/119 |
| 3,985,199 | 10/1976 | Baird | 181/107 |
| 3,997,021 | 12/1976 | Chelminski | 181/119 |
| 4,034,827 | 7/1977 | Leerskov, Jr. et al. | 181/107 |
| 4,038,630 | 7/1977 | Chelminski | 181/111 |
| 4,047,591 | 9/1977 | Ward et al. | 181/107 |
| 4,106,585 | 8/1978 | Huizer | 181/107 |
| 4,141,431 | 2/1979 | Baird | 181/107 |

*Primary Examiner*—Howard A. Birmiel
*Attorney, Agent, or Firm*—Parmelee, Johnson, Bollinger & Bramblett

[57] ABSTRACT

Firing of a seismic source of the type called an air gun is detected by means of a fluid pressure sensor transducer in fluid communication with a shuttle-operating chamber of the air gun, and this sensor detects a surge in pressure in a portion of this chamber resulting from rapid motion of the shuttle, thereby producing an electrical signal which provides an accurate indication of the actual time of firing called the "shot instant" of the air gun. The reaction time between the electrical firing command signal and the shot instant is not the same for all air guns in a seismic survey array but may differ from one to another due to variations in the solenoid-actuated valves which trigger the air gun, in tolerances of the air gun parts, frictional effects and slight differences in mass of moving parts, and wear of parts. The method and apparatus as disclosed enables a geophysical survey crew accurately to determine the reaction time of each individual air gun seismic energy source. Once their reaction times are determined, adjustments can be made in the firing command signals whereby the respective shot instant of air guns in an array can be synchronized, sequenced, or otherwise controlled in accord with any desired predetermined air gun array survey program. A convenient to install module is mounted in the electrical connections and pressurized gas supply line leading into the air gun, and a pressure transducer within this module senses the sudden changes occurring in the supply line as a result of surge in pressure in the shuttle-operating chamber produced by the rapid motion of the shuttle at the firing of the air gun.

8 Claims, 6 Drawing Figures

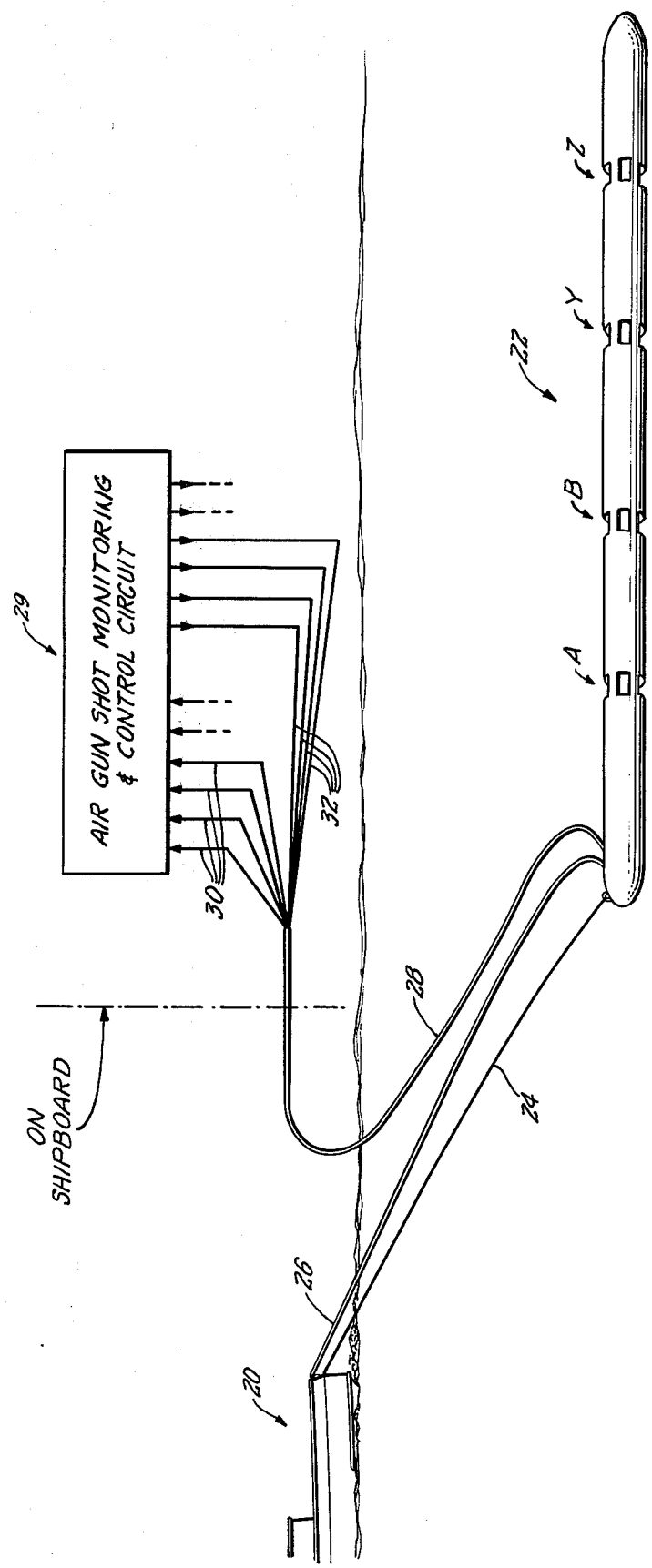

AIR GUN MONITORING METHOD AND APPARATUS

BACKGROUND OF THE INVENTION

This invention relates to the generation of seismic energy in a medium by the use of seismic sources of the type called air guns, and more particularly, to a method and apparatus for monitoring the firing of such air guns in order that the actual instant of firing of each gun, the shot instant, may be known and accurately controlled, for example, so that the shot instants may be synchronized, or sequenced, or otherwise controlled in accordance with a predetermined program.

In seismic surveying in a medium, such as water, acoustical energy is generated by air guns submerged in the water and is utilized to investigate subsurface geological conditions and formations. For this purpose, one or more of such air guns are submerged in the water, and compressed air, or other gas or gases under pressure, is fed to the submerged guns and temporarily stored therein. At the desired instant, the seismic source air guns are actuated, i.e., fired, and pressurized gas is abruptly released into the surrounding water. In this manner, powerful acoustic waves are generated capable of penetrating deeply into subsurface material to be reflected and refracted therein by the various strata and formations. The reflected or refracted acoustical waves are sensed and recorded to provide information and data about the geological conditions and formations.

It is also possible to submerge such seismic sources in marsh land, swamp or mud areas which are infused with sufficient water that the seismic surveying apparatus described herein can be used. Accordingly, the term "water" as used herein is intended to include marsh land, swamp or mud which contains sufficient water to enable such apparatus to be used.

It has been found advantageous in marine seismic exploration to generate a plurality of acoustic waves from an array of air guns in order to provide a composite acoustic wave of satisfactory amplitude and frequency content. Air guns having various volume capacities are generally utilized in such arrays in order to produce a composite acoustic wave having a broad frequency band, as air guns of different volumes generate acoustic waves with different frequency spectrums. For further background on air guns and solenoid valves, reference may be made to U.S. Pat. Nos. 3,249,177; 3,379,273; 3,779,335; 3,588,039; 3,653,460; 3,997,021 and 4,038,630 assigned to the same assignee as the present application.

In the past, attempts have been made to synchronize the timing of the solenoid-controlled valves which trigger the individual air guns. However, the time at which a solenoid plunger actually becomes actuated in response to an electrical signal will vary with each valve, and then there are further variables caused by the mechanical structure of each air gun, such as dimensional tolerance variation, slight differences in shuttle mass, different frictional drag of moving parts, wear of parts, and so on. When the individual air guns are not actually operating in accordance with the prescheduled precisely timed relationship, then the downgoing seismic waves are not in accordance with the predetermined survey program, and less than optimum results are obtained. For example, if the survey program calls for all of the air guns to fire in synchronism, and they are not synchronized, the downgoing seismic waves are misaligned. Misalignment may cause reduction in total amplitude of the downgoing seismic waves or cause the generation of seismic waves with undesirable frequency spectra, or both, resulting in data collection with reduced penetration and resolution.

A solution to the problem of inaccurate firing ("shot") instant as set forth in U.S. Pat. Nos. 4,034,827 and 4,047,591, assigned to Texas Instruments, Incorporated, has been to sense movement of a gas-releasing shuttle within each air gun by magnetic, electromagnetic or electrostatic field effects to establish the precise instant of firing of each individual air gun. The firing signals applied to the respective air gun solenoids are then delayed or advanced relative to each other in subsequent firings to properly synchronize or sequence the firings of the respective air guns. In those patents, the air guns are modified in order that a field such as a magnetic field be set up. The air guns are further modified in order that variations in that field caused by movement of the shuttle can be detected.

In the final paragraph of each of the above two patents, possible arrangements for producing a magnetic, electromagnetic or electrostatic field and sensing variations in that field were listed. A primary disadvantage of each of the embodiments suggested in these patents is that some one or more complex modifications of the air gun itself is required. Such modifications of an air gun to include means for generating a magnetic, electromagnetic or electrostatic field plus means to sense variations in that field are generally complicated procedures which cannot be accomplished by an operating crew and even such modification of air guns yet to be manufactured is costly. Further, any repairs by an operating crew to a sensor which is built into the air gun is time-consuming and costly.

As used herein, the term "gas" is used in a broad sense to include any compressible gaseous fluid which may be utilized in an air gun, and it includes (but is not limited to) air, steam, nitrogen, carbon dioxide, gaseous products of combustion, and mixtures thereof.

As used herein, the term "misfire" or similar wording means the same thing as "no fire" as used in said patents of Texas Instruments. This term "misfire" also includes a condition of continuous leakage of pressurized gas from an air gun. The term "malfunction" or similar wording means the same thing as "auto fire" as used in said patents.

SUMMARY

In accordance with the invention in one of its aspects, movement of the air gun shuttle is detected by a fluid pressure sensor responsive to variations in fluid pressure caused by movement of the shuttle.

In accordance with further aspects of the invention, the fluid pressure sensor is in a module which is convenient to instal onto an air gun and its solenoid valve.

It is an object of this invention to provide a novel method and apparatus for sensing movement of an air gun shuttle to signal the instant of firing of the air gun while requiring little if any modification to the basic air gun structure and allowing for ease in replacement of the sensor.

It is among the advantages of the illustrative embodiment of the present invention that a conveniently installed sensor module containing a pressure sensor transducer can be mounted onto the air gun and its solenoid valve without making any structural modification in either the air gun or the solenoid valve, and yet this sensor provides an electrical signal which is an accurate indication of the shot instant for the air gun. In the event that the pressure sensor transducer ever needs to be replaced, the survey crew can quickly and conveniently remove the sensor module and replace it.

It is among the further advantages of the method and apparatus which are described herein that the pressure surge which occurs in the upper portion of the shuttle-operting chamber during the sudden movement of the shuttle at the instant of firing is sensed through the very same passageway which is used for feeding pressurized gas into the air gun. Thus, this gas supply passageway is employed for sensing purposes, thereby enabling the shot instant to be determined and an electrical signal to be transmitted to provide an accurate indication of the shot instant.

BRIEF DESCRIPTION OF THE DRAWINGS

The foregoing and other objects, features, and advantages of the invention will be pointed out in or become apparent from the following more particular description of a preferred embodiment of the invention, as illustrated in the accompanying drawings, in which like reference characters refer to the same parts throughout the different views. The drawings are not necessarily to scale, emphasis instead being placed upon illustrating the principles of the invention.

FIG. 1 illustrates a seismic survey vessel towing a multiple air gun marine seismic survey streamer. For illustrative purposes, the multiple air gun streamer is shown enlarged relative to the towing vessel, and a block illustration of the monitoring and control circuitry is shown enlarged at the upper right;

DETAILED DESCRIPTION

Figure 3:
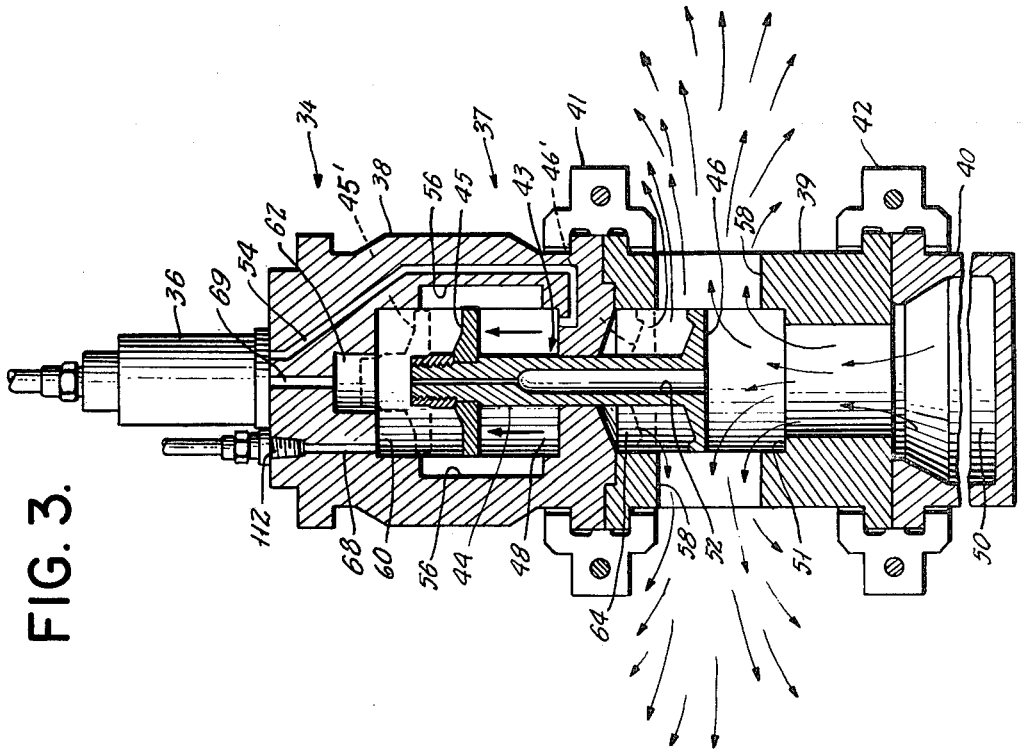
FIG. 3 is a side view similar to FIG. 2 but illustrating firing of the air gun.

As shown in FIG. 1, a survey vessel 20 tows a streamer of air guns 22 by a tow line 24. The streamer 22 is preferably of the type disclosed in U.S. Pat. No. 4,038,630 and supports a multiplicity of air guns, of which four, A, B, Y and Z, are shown. Although a streamer 22 is shown as preferred, it is to be understood that the multiple air guns can be towed by a conventional towing arrangement as known in the art. High pressure gas is supplied to the respective guns through gas supply lines which may run in a bundle 26 from the vessel 20.

Each air gun within the streamer is fired by an electrical trigger pulse received through a multiple line electric cable 28. These trigger signals are transmitted through the cable 28 along individual electrical firing control lines 32 from an air gun shot monitoring and control circuit 29.

In order to accurately monitor the actual firing of the several air guns, a sensor signal is transmitted from each air gun along an individual electrical line 30 within the cable 28 to the air gun shot monitoring circuit. To cause each of the air guns to fire precisely in accordance with its preselected desired timed relationship, i.e., synchronously or in timed sequence, the monitoring and control circuit 29 then advances or delays particular ones of the signals being fed into the respective firing control lines 32 in order to bring their actual shot instants into accordance with the predetermined survey plan.

The signalling of a misfire (no fire) and malfunction (auto fire) and the sensing of the shot instant for each air gun may be accomplished by any appropriate circuitry within the control circuit 29 connected to the sensor signal lines 30, for example, such as taught in the Texas Instruments patents to which reference is made above, and the respective trigger signal pulses applied to the control lines 32 may be delayed or advanced as taught there.

Figure 2:
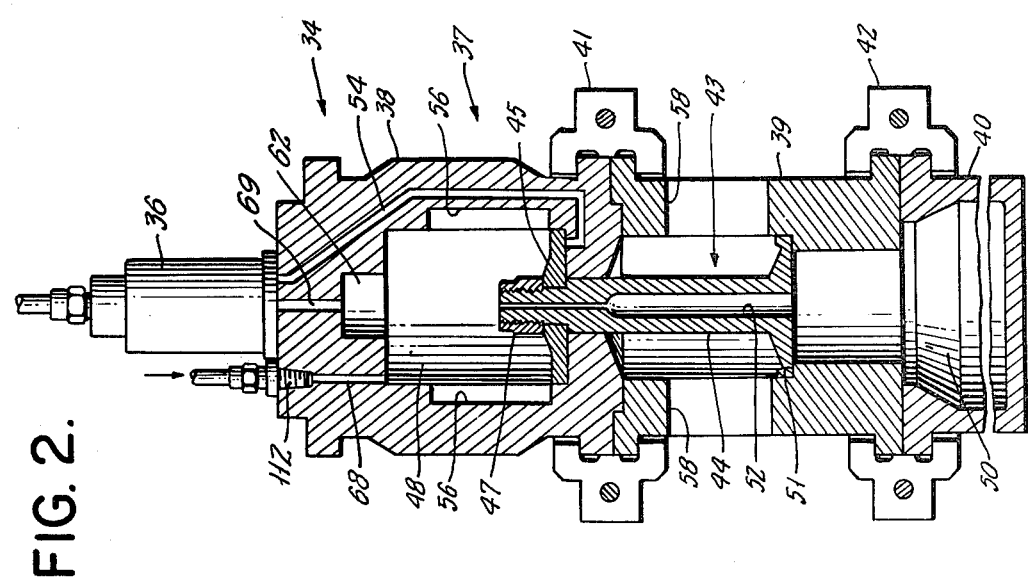
FIG. 2 is a side view of an air gun assembly with a solenoid valve at the top and with the air gun and its shuttle shown in section.

Each air gun in the streamer 22 is of the type indicated at 34 in FIGS. 2 and 3. The air gun 34 includes a housing 36 for the solenoid-actuated valve and a housing assembly 37 in which the shuttle is located.

The housing assembly 37 of the air gun 34, and the operation of that portion of the air gun is conventional, there being no significant modifications to air gun 34 itself. The housing 37 includes three sections, the operating chamber section 38, the discharge port (or intermediate) section 39, and a charge chamber section 40, sometimes called the firing chamber. These sections are united to form a single unit by removable clamps 41 and 42. The use of a removable section as the charge chamber section 40 is particularly advantageous in that the volume of the pressurized gas storage, and thus the frequency and characteristics of the resulting seismic signal, may be readily changed by changing the charge chamber section.

The primary moving element of the air gun is a shuttle 43 which includes a central shaft 44, an upper piston element 45, and a lower piston element 46. The upper piston element 45 is joined to the shaft 44 by a locknut 47. This upper piston element rides in an operating chamber 48 and controls discharge of the air gun. The lower piston element 46 normally rests on a seat 51 to close a pressurized gas charge chamber 50.

In the charged condition, as shown in FIG. 2, pressurized gas, for example such as compressed air, is supplied through a passage 68 and fills the operating chamber 48, and that pressurized gas presses down on the shaft 44 and on piston element 45 to hold the shuttle 43 in its lowermost position, which is called the closed position. In that position, the charge chamber 50 is closed by piston element 46, and a charge of pressurized gas, having passed from the operating chamber 48 through a bore 52 in the shuttle shaft, is retained in the charge chamber. The surface area of the shuttle 43 exposed to pressurized gas in the charge chamber 50 is somewhat less than the area exposed to pressurized gas in the operating chamber 48. Thus, the resultant forces act downward on the shuttle and hold it in the position shown in FIG. 2.

To fire the air gun, pressurized gas is applied through a trigger passage 54 to the bottom surface of the upper piston element 45. The force applied by the gas from the passage 54 pushing upwardly on the upper piston element is sufficient to unbalance the previous resultant downward force on the shuttle, and causes the shuttle to move rapidly upwardly. The seat 51 for the lower piston 46 is sufficiently deep that the charge chamber remains closed with initial movement of the shuttle. Then, the upper piston 45 reaches bypass passages 56 formed in the side of the operating chamber. At that point, pressurized gas in the operating chamber 48 is free to move from above the piston 45 to below it, thereby tending to equalize the pressure forces applied to that piston, and the shuttle quickly accelerates upwardly driven by the force of the pressurized gas in the charge chamber 50. With the shuttle accelerating abruptly upwardly, the charge chamber is opened, and pressurized gas pushes with explosive-like forcefulness out through discharge ports 58 to create a powerful seismic impulse.

The bypass passages 56 do not extend to the top of the operating chamber 48. Thus, as the piston element 45 travels above the upper ends of those passages, as shown by broken lines 45' in FIG. 3, gas becomes trapped in the upper postion 60 of the operating chamber 48 and in a reduced-diameter upper portion 62. This trapped gas acts as a shock absorber and acts to bring the shuttle to a halt and then to drive it back down towards its closed position. Similarly, water is trapped in a space 64 above the lower piston as shown at 46' to help stop the upward movement of the shuttle.

It is the above-described abrupt acceleration of the shuttle 44 toward the upper portion 60, 62 of the operating chamber which is detected to provide an indication of the exact firing time of the air gun. In accordance with the present invention, a fluid pressure sensor transducer 66 is positioned in a readily installed sensor module 61. This sensor 66 is in fluid contact with the upper portion 60, 62 of the operating chamber and detects the abrupt rise in fluid pressure within this upper portion of the chamber 48 with the approach of the fast-moving shuttle. The present invention takes advantage of the abrupt pressure rise occurring in the upper portion of the operating chamber of an air gun upon firing of the gun to enable the transducer 66 to produce an electrical signal providing an accurate indication of the shot instant.

The above-described components of the air gun housing assembly 37 are completely conventional. This gas supply passage or port 68 through which pressurized gas is supplied to the operating chamber is also advantageously employed as the port through which the gas pressure in the upper portion 60, 62 of the operating chamber is sensed. As in conventional air guns, the gun 34 is triggered by energization of a solenoid winding (not shown) in the valve housing 36 which moves a valve plunger (not shown) to open a fluid passage between a passage 69 and the trigger passage 54. The solenoid valve housing 36 is secured onto operating section 38 of the air gun 34 by bolts 70 in conventional manner.

Figure 4:
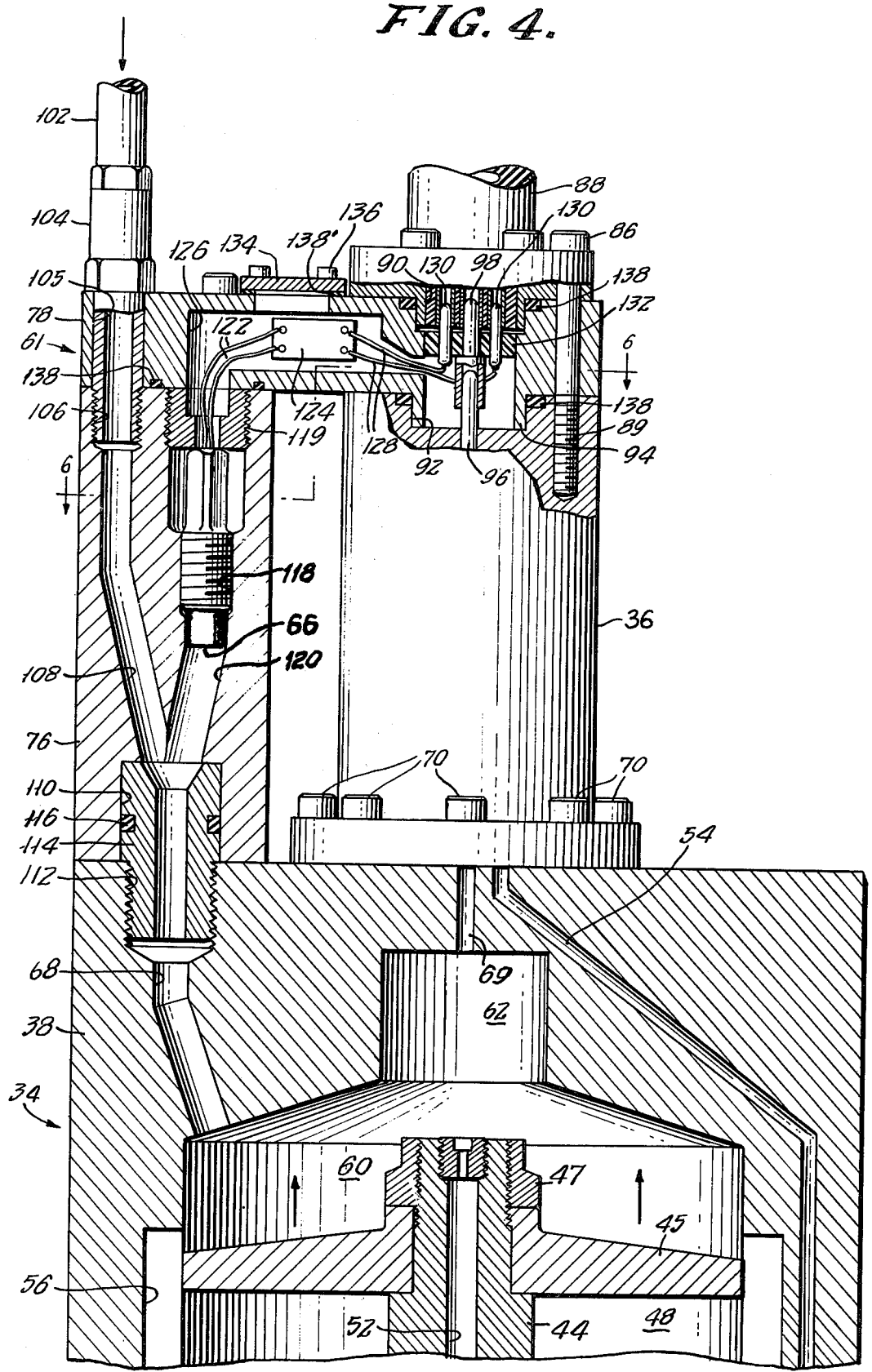
FIG. 4 is an enlarged elevational sectional view of the upper portion of FIG. 3 showing a pressure sensor transducer module mounted onto the air gun and onto the solenoid valve.
Figure 5:
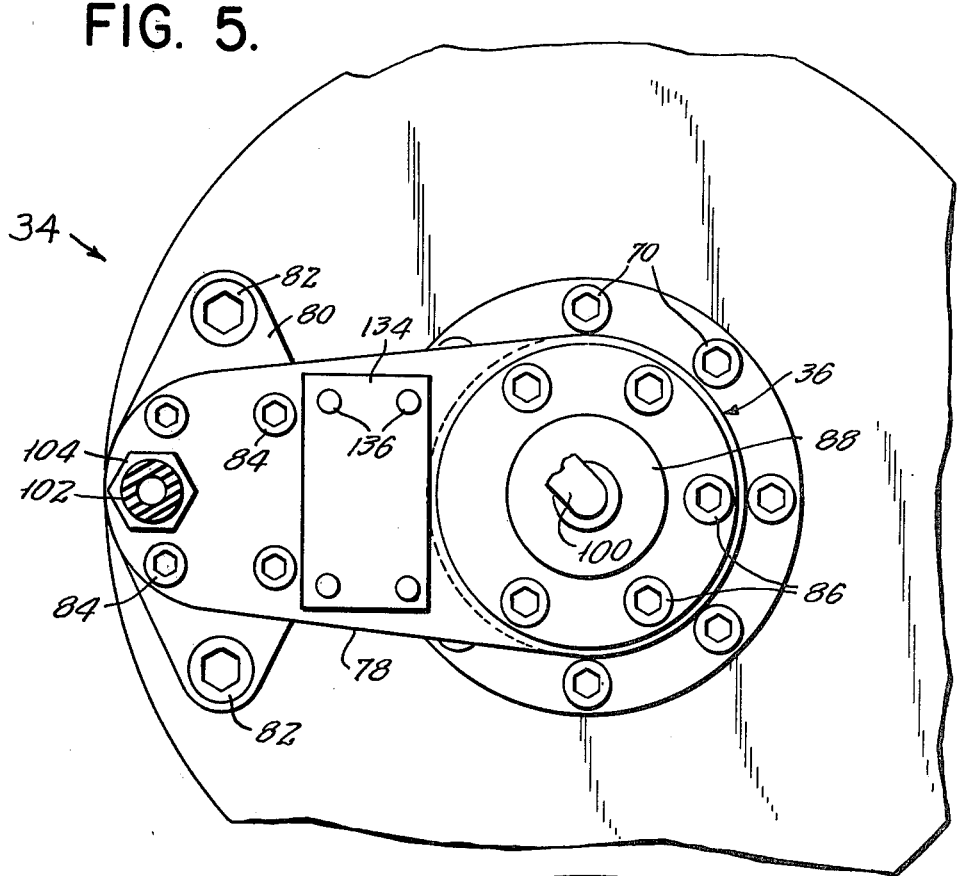
FIG. 5 is a top view of the assembly shown in FIG. 4.
Figure 6:
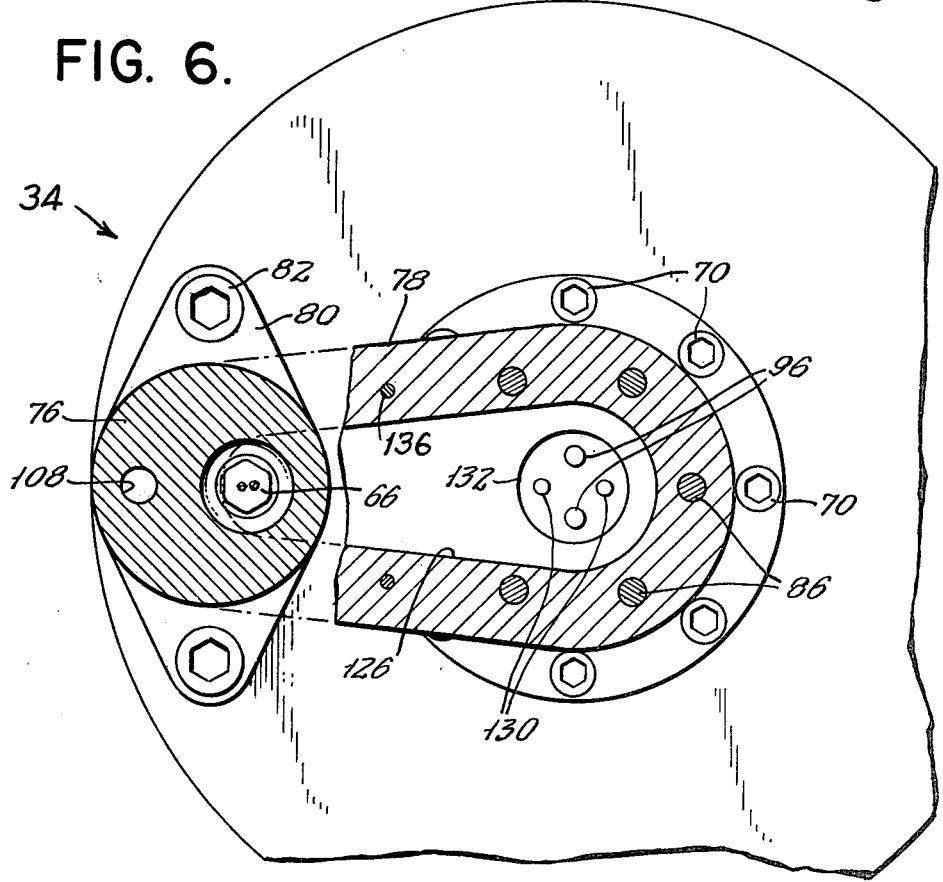
FIG. 6 is a sectional view taken along the line 6—6 in FIG. 4.

The sensor module 61 is generally L-shaped, as seen in side elevation in FIG. 4. It includes an upright housing pedestal 76 which extends parallel with the solenoid valve 36 and a bridging housing member 78 which spans across between the upper end of the housing 76 and the upper end of the solenoid valve. As seen in FIGS. 5 and 6, the upright housing member 76 has a flange 80 secured by bolts 82 to the operating section 38 of the air gun 34. The bridge housing 78 is removably attached to the upright housing 76 by bolts 84 and is removably attached to the solenoid valve housing 36 by bolts 86, which also serve to attach an electrical connector 88 onto the bridge housing 78. It is noted that the bolts 86 may engage in tapped sockets 90 in the top end of the solenoid valve housing 36. These threaded sockets 89 are conventionally used for attaching the electrical connector 88 directly onto the solenoid valve. However, in this illustrative embodiment of the invention the bridge housing 78 is interposed between the solenoid valve housing 36 and the connector 88.

The top of the bridge housing 78 may have a socket 90 which is the same shape as the socket 92 at the top of the solenoid valve housing. Thus, the electrical connector 88 may readily be plugged into the socket 90 in the bridge housing 78, while the latter has a plug portion or boss 94 on the bottom thereof which is adapted to plug into the valve socket 92.

The winding (not shown) of the solenoid valve has its terminals connected to a pair of electrical contact prongs 96 (see also FIG. 6). In order to reach the mating socket contacts in the connector 88, an extender prong 98 is mounted on each of the prongs 96. These extender prongs 98 each has a socket which seats down onto a respective prong 96. The electrical firing line 32 (FIG. 1) to the solenoid valve of the respective air gun extends from cable 28 (FIG. 1) through an electrical cable 100 (FIG. 5), being connected to the respective socket contacts in the connector 88 for mating with the pair of prongs 98. Thus, the air gun can be fired by transmitting an electrical trigger pulse over the appropriate line 32 to the solenoid valve 36.

In order to supply pressurized gas, for example, such as compressed air, at a pressure in the range from 1,500 to 4,500 pounds per square inch, or more, there is a pressure hose line 102. This hose line terminates in a fitting 104 which extends through a hole 105 in the bridge housing 78 and screws into a threaded socket 106 in the pedestal housing 76 communicating through a passage 108 with a socket 110 at the lower end of this housing. The hose line 102 is a continuation from the group of lines 26 (FIG. 1).

The operating section 38 of the air gun 34 may have a threaded socket 112 communicating with the gas supply passage 68. To couple the passageway 108 in the pedestal housing with the supply passage 68 in the air gun, a coupling nipple 114 is screwed into the socket 112, and it fits into the socket 110 with an O-ring seal 116.

The advantageous manner in which the firing of the air gun is monitored will now be described. It is to be noted that when the shuttle 43 is driven upwardly at high velocity with firing of the air gun, a sharply abrupt pressure surge occurs with momentary trapping and compressing of gas in the upper portions 60 and 62 of the operating chamber 48 above the shuttle. This very sudden pressure surge occurring as the shuttle nears the top of its fast-moving stroke can be used as an accurate, dependable measure of the time of firing of the air gun. The fluid pressure sensor transducer 66 is removably mounted in a threaded socket 118 in the pedestal member 76 so as to be in fluid communication with the upper portion 60, 62 of the operating chamber. A retainer nut 119 having a through bore may be screwed down into the socket 118 for securing the transducer 66. A passage 120 connects the socket 118 with the coupling socket 110 for providing communication with the gas supply passage or port 68 in the air gun.

The transducer 66 responds to the pressure surge occurring in the upper portion of the operating chamber by producing an electrical signal pulse. This signal pulse is transmitted over one of the electrical lines 30 to the control circuit 29 and thereby provides information on the instant when the air gun has fired, which may be called the shot instant. The circuit from the transducer 66 to the electrical line 30 may be traced in FIG. 4 as follows. From the top of the transducer 66 extends a pair of insulated electrical wires 122 which are shown connected to an impedance matching transformer 124 positioned in a chamber 126 within the bridge housing. This chamber 126 communicates with the top of the socket 118 and also with the socket 92 in the solenoid valve housing. A pair of insulated wires 128 connect the other side of this transformer 124 to a pair of contact prongs 130 located in the socket 90 near the other contact prongs 96. These contact prongs 130 mate with a pair of socket contacts in the connector plug 88 which in turn are connected to one of the sensor signal circuit lines 30 extending through the cable 100 to the cable 28 and thence to the monitoring and control circuit 29. The contact prongs 130 and the extender prongs 98 are held by an insulating mount 132 fitted into the socket 92 in the solenoid valve housing.

If the impedance of the sensor transducer 66 is suitable, the transformer 124 may be omitted, in which case the leads 122 are directly connected to the leads 128. As an alternative to the separate transformer 124, an impedance matching arrangement may be included within the transducer unit 66. This transducer may, for example, be of the magnetostrictive or piezoelectric type, for example, such as the high-sensitivity pressure transducer model No. 112A03 obtainable commercially from PCB Piezotronics, Inc., P. O. Box 33, Buffalo, N.Y. 14225. This particular transducer has a quartz element.

It is to be understood that the chamber 126 and the portion of the socket 92 below the mount 132 are filled with a potting material, which is not shown for purposes of clarity of illustration. The potting material can be introduced into the chamber 126 through an opening below a cover plate 134 secured by bolts 136 with a seal 138'.

There are appropriate O-ring seals 138, as shown in FIG. 4, for sealing the joints between various parts. Thus, the housing 61 can be mounted onto the air gun in fluid-tight sealed relationship with the sensor passageway 120 effectively forming an extension of the passageway 68 leading into the upper portion 60, 62 of the operating chamber 48.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. In a method for monitoring the firing of an air gun for determining the instant of firing, said air gun including a shuttle rapidly movable within an operating chamber to abruptly release pressurized gas from a pressurized gas charge chamber, such rapid shuttle movement causing fluid to be trapped within a portion of said operating chamber in front of the fast-moving shuttle to decelerate said shuttle, the invention comprising:
   monitoring the fluid pressure within said portion of said operating chamber, and
   signalling the abrupt rise in that pressure which occurs when the fluid is trapped in front of the fast-moving shuttle for indicating the instant of firing of the air gun.

2. In a method of monitoring the operation of an air gun for determining the "shot" instant, said air gun including a shuttle suddenly movable within an operating chamber toward an end portion of the chamber in response to actuation of a solenoid valve for firing the air gun by the opening stroke of said fast-moving shuttle abrupt-releasing pressurized gas from a charge chamber in the air gun and wherein said operating chamber has bypass passages formed in the side of the operating chamber which terminate before said end portion of the operating chamber, and wherein gas is trapped within said end portion of the operating chamber in front of the fast-moving shuttle after the front of the shuttle has moved beyond said bypass passages thus causing an abruptly rising pressure pulse to occur in said trapped gas as the fast-moving shuttle nears the end of its opening stroke, the invention comprising the steps of:
   providing a passageway communicating with said end portion of the operating chamber toward which the shuttle suddenly moves upon firing of the air gun and in which said abruptly rising pressure pulse occurs, and
   sensing the abruptly rising pressure pulse which appears in said passageway for detecting the pressure pulse which occurs in said end portion of the operating chamber as a result of said sudden shuttle motion for monitoring the shot instant of the air gun.

3. In a method of monitoring the operation of an air gun for determining the "shot" instant, the invention as claimed in claim 2, including the further steps of:
   providing a housing mountable on the air gun and having a second passageway positioned for forming an extension of the first passageway, and
   mounting a pressure transducer in said housing communicating with said second passageway for sensing said abruptly rising pressure pulse.

4. For use with an air gun which is fired through suddenly moving a shuttle to open a discharge port for abruptly releasing pressurized gas from the air gun through the discharge port, and wherein the fast-moving shuttle causes a sudden increase in pressure to occur within a predetermined portion of the air gun, apparatus for sensing the instant of firing of the air gun comprising:
   housing means adapted to be mounted upon the air gun in fluid-tight sealed relationship therewith,
   said housing means having a passageway therein adapted to communicate with a passage in the air gun leading into the air gun to said predetermined portion thereof wherein said sudden increase in pressure is caused by the fast-moving shuttle upon firing of the air gun,
   a pressure transducer removably mounted in said housing communicating with said passageway therein for sensing the sudden increase in pressure occurring upon firing of the air gun for producing an electrical signal indicating such sudden increase in pressure, and
   means in said housing for making electrical connection to said transducer for transmitting said electrical signal to provide information as to the instant of firing of the air gun,
   thereby enabling the instant of firing of the air gun to be sensed without modifying the air gun.

5. In an air gun actuated through suddenly moving a shuttle to open a discharge port for abruptly releasing pressurized gas from the air gun through the discharge port, and wherein the air gun is actuated by an electrical firing signal transmitted over an electrical cable and through an electrical connector to a solenoid valve mounted on the air gun, the improvement comprising apparatus for informing of the actual instant of firing of the air gun comprising:

a housing mountable on the air gun and communicating with the interior of the air gun and having a pressure transducer therein for producing an electrical signal in response to a sudden increase in pressure in the air gun occasioned by the sudden movement of the shuttle at the instant of firing, said housing having first and second electrical connection means and being connectible between said electrical cable connector and said solenoid valve for providing a connection through said first connection means between said electrical cable connector and the solenoid valve for transmitting the firing signals to the solenoid valve, and said second connection means being connected to said pressure transducer for providing a circuit to said electrical cable connector for transmitting an electrical signal from said transducer through said connector and cable for informing of the instant of firing of the air gun.

6. In an air gun adapted to be fired repetitively by causing a fast-moving shuttle to move toward an open position for suddenly releasing pressurized gas through a discharge port during each firing for generating impulses useful for gephysical exploration to which pressurized gas is supplied through a supply line to a supply port in the air gun feeding into a chamber therein and to which electrical firing signals are transmitted through a cable having a cable connector of the type detachably fastenable to a solenoid valve attached to the air gun to initiate each firing thereof, apparatus for accurately monitoring the firing of the air gun comprising:

a housing having first and second electrical connection means, said housing being connectible between the solenoid valve and such electrical cable connector for providing an interconnection through said first connection means between the connector and the solenoid valve for transmitting the firing signals to the solenoid valve, said housing having pressurized gas connection means, said housing being connectible between said supply port and said supply line for supplying pressurized gas from said supply line through said pressurized gas connection means and through said supply port into said chamber, a pressure transducer mounted within said housing communicating with said pressurized gas connection means for sensing a sudden pressure increase within said connection means as caused by sudden increase in the pressure in said chamber occurring in front of the fast-moving shuttle during the firing of the air gun for generating an electrical response signal at the time of each firing of the air gun, and said second electrical connection means providing connection between said pressure transducer and said cable connector for transmitting said response electrical signals through the cable to provide information of the actual time of firing of the air gun, thereby monitoring the actual instant of firing without modifying the air gun.

7. In an air gun actuated by rapidly moving a shuttle with a fast-opening motion from a closed position to an open position to abruptly open an exhaust port for suddenly releasing pressurized gas stored in the air gun, and wherein the shuttle rapidly moves toward an end portion of an operating chamber during said fast-opening motion and wherein there are bypass passages formed in the side of the operating chamber which end before said end portion thus causing gas to become trapped and rapidly compressed in said end portion of the operating chamber in front of the fast-opening shuttle, thereby creating an abruptly rising pressure pulse to occur in said trapped gas, apparatus for monitoring the instant of firing of the air gun comprising:

said air gun having a passageway therein extending out from said end portion of the operating chamber, and a pressure transducer mounted upon the air gun and communicating with said passageway for being responsive to said abruptly rising pressure pulse occurring in said end portion of the operating chamber to provide an electrical signal upon the occurrence of said abruptly rising pressure pulse, thereby indicating occurrence of said fast-opening motion of the shuttle for indicating the instant of firing.

8. In an air gun including a shuttle rapidly movable within an operating chamber toward an end portion of the operating chamber for suddenly releasing pressurized gas from a pressurized gas charge chamber, apparatus for indicating the instant of firing of the air gun comprising:

said operating chamber having bypass passages in the side thereof, said bypass passages terminating at a distance from said end portion of the operating chamber causing gas to become trapped and rapidly compressed in front of the fast-moving shuttle as the shuttle approaches close to said end portion of the operating chamber thus creating an abrupt pressure increase to occur in said end portion, said air gun having a passageway communicating with said end portion of the operating chamber, and a pressure transducer mounted on the air gun communicating with said passageway for responding to said abrupt increase in pressure by providing an electrical signal, thereby indicating the instnt of firing of the air gun.

* * * * *